United States Patent [19]
Okamura

[11] Patent Number: 5,977,748
[45] Date of Patent: Nov. 2, 1999

[54] STORAGE CAPACITOR POWER SUPPLY AND METHOD OF OPERATING SAME

[75] Inventor: Michio Okamura, Kanagawa, Japan

[73] Assignee: JEOL Ltd., Tokyo, Japan

[21] Appl. No.: 09/120,683

[22] Filed: Jul. 21, 1998

Related U.S. Application Data

[63] Continuation-in-part of application No. 08/041,543, Apr. 2, 1993, Pat. No. 5,783,928.

[30] Foreign Application Priority Data

| Apr. 3, 1992 | [JP] | Japan | 4-082173 |
| Apr. 3, 1992 | [JP] | Japan | 4-082174 |
| Mar. 4, 1993 | [JP] | Japan | 5-043467 |

[51] Int. Cl.⁶ .................... H01M 10/44; H01M 10/46
[52] U.S. Cl. .................. 320/118; 320/120; 320/166
[58] Field of Search .................... 320/116, 118, 320/119, 120, 127, 128, 135, 166

[56] References Cited

U.S. PATENT DOCUMENTS

| 4,281,277 | 7/1981 | Lekey | 320/120 |
| 5,783,928 | 7/1998 | Okamura | 320/122 |

FOREIGN PATENT DOCUMENTS

| 0101017 | 8/1983 | European Pat. Off. . |
| 0 410559A2 | 1/1991 | European Pat. Off. . |
| WOA9207371 | 4/1992 | WIPO . |

OTHER PUBLICATIONS

M.F. Rose, "Performance Characteristics of Large Surface Area Chemical Double Layer Capacitors", *Proc. Int. Power Sources Symp.*, vol. 33, pp. 572–592 1998.

Communication for the European Patent Office enclosing the European Search Report for Application No. EP 93 30 2233 citing: Patent Abstracts of Japan, vol. 16, No. 472 (E–1272) Sep. 30, 1992.

JP–A–04 168 939, Jun. 17, 1992 *abstract*.

Soviet Inventions Illustrated Week 7915, May 23, 1979, Derwent Publications Ltd., London, GB.

AN 79–D2705B BOMKO 'supply system for pulse gas–discharge lamp with control voltage limiter and inductance capacitance network energy measuring system to reduce charging current interval' and SU–A–608 274 (BOMKO A.G.) May 17, 1978 *abstract*.

*Primary Examiner*—Edward H. Tso
*Attorney, Agent, or Firm*—Webb Ziesenheim Logsdon Orkin & Hanson, P.C.

[57] ABSTRACT

A storage capacitor power supply has a plurality of electric double layer capacitors connected in series. Each capacitor has connected in parallel therewith a charge-limiting circuit. Each charge-limiting circuit measures a voltage across its corresponding capacitor and causes a charging current to bypass the capacitor when it is charged to a value corresponding to a reference voltage established by the charge-limiting circuit. When all the capacitors are charged to their corresponding reference voltages, the charging current is terminated whereafter the capacitors are discharged with a discharge current. When the capacitors are charged with a recharging current from a partially discharged state, the capacitors are charged to values corresponding to their respective reference voltages at the same time without bypassing the recharging current around one or more of the capacitors.

5 Claims, 3 Drawing Sheets

5,977,748

STORAGE CAPACITOR POWER SUPPLY AND METHOD OF OPERATING SAME

RELATED APPLICATIONS

This is a continuation-in-part of application Ser. No. 08/041,543, filed Apr. 2, 1993 now U.S. Pat. No. 5,783,928,.

FIELD OF THE INVENTION

The present invention relates to a storage capacitor power supply which stores electrical power in a capacitor block consisting of a plurality of electric double layer capacitors connected in series or in a combination of series and parallel, and supplies electrical power to a load.

BACKGROUND OF THE INVENTION

Discussions have existed for many years as to whether exhaust gas from automobiles with gasoline engines should be controlled because of problems with the global environment. In practice, the annual production of automobiles is still on the upswing but there is no prospect of reduction in automobile emissions. Under these circumstances, electric vehicles with batteries or solar cells have attracted attention as vehicles producing no exhaust gas. Therefore, there is an urgent need of early realization of practical electric vehicles.

In recent years, electric vehicles have begun to be used as vehicles in business applications, such as urban delivery vehicles and garbage trucks, which are not required to travel a long distance continuously or to run at high speeds. Vehicles running at high speeds faster than 100 km/h and traveling about 200 km continuously have been reported as experimental vehicles. Furthermore, vehicles which have solar cells on the top of the body and run while charging the cells have been proposed. In addition, hybrid vehicles driven by both an internal combustion engine and an electric motor have been proposed.

One promising type of electric vehicle is a vehicle which has no gearing, as used in an automobile with an internal combustion engine, but drives the four wheels independently using wheel motors. The driving mechanism of this vehicle is simplified. Also, the problems with the operating characteristics and the operability can be solved by coordinating and controlling the wheel motors. The greatest technical problem with the electric vehicle is to realize an ideal power source, i.e., a battery having a capacity comparable to an automotive engine. In order to put the electric vehicle into practical use, a battery is needed which is comparable in size and weight to an internal combustion engine and whose capacity can deliver power comparable to the power delivered by a gasoline engine. Furthermore, the battery must be recharged quickly or must be replaced with a fully charged battery as simply as a supply of gasoline.

However, no conventional battery can satisfy the above-described requirements. One especially great problem is that it takes long for the prior art battery to be recharged. In spite of this fact, the prior art battery is larger in size and heavier than the internal combustion engine.

An electric double layer capacitor which is smaller in size but larger in capacitance than the prior art capacitor has been developed. This electric double layer capacitor tends to be used to back up a power supply or for another application. When a large-capacity capacitor, such as this electric double layer capacitor, is employed as a storage capacitor power supply, it has advantages in being lighter and having longer life than a lead-acid battery and other batteries. However, if the voltage applied to the electric double layer capacitor exceeds the rated voltage, then the capacitance of the capacitor is reduced. Also, the leakage current increases. In this way, the capacitor is adversely affected. Another disadvantage is that the internal resistance and the maximum working voltage are not sufficiently controlled. For these reasons, positive use of the electric double layer capacitor for power use is not yet made.

Heretofore, when a secondary battery is recharged, various difficulties have arisen in precisely detecting the completion of the recharging.

Various contrivances have been made to detect the completion of the recharging. One method is to set the end voltage at a given voltage. Another method is to estimate the completion from the amount of electricity flowed into the battery. A further method is to detect the instant at which the voltage slightly drops due to the temperature characteristics of the battery after it is recharged for a given time. In spite of these contrivances, the recharging characteristics vary widely according to the conditions of the battery, i.e., depending on whether the battery is new or old, on the extent to which the battery ages, on the recharging current, and on whether the battery has been used continuously or was recharged.

SUMMARY OF THE INVENTION

It is an object of the present invention to provide a long-lived, lightweight storage capacitor power supply which is capable of being quickly charged and of supplying a regulated voltage to a load.

It is another object of the invention to provide a storage capacitor power supply which stores electricity efficiently by the use of capacitors and supplies electric power to a load.

These objects are achieved in accordance with the teachings of the invention by a storage capacitor power supply adapted to store electricity in a capacitor block consisting of a plurality of capacitors connected in series, or in a combination of series and parallel, and to supply electric power to a load, the power supply comprising: the capacitor block connected with the load and supplying electric power to the load; a charging circuit for electrically charging the capacitor block; a charging power supply connected with the capacitor block via the charging circuit; and charge-limiting circuits which detect the voltages developed across the capacitors and limit charging of the capacitors if the detected voltages reach a given value.

One embodiment of the invention further includes a charge-limiting circuit having a detection circuit and a bypass circuit connected in parallel with each capacitor of the capacitor block. Each charge-limiting circuit may cause a charging current to bypass the capacitor. Each detection circuit causes the corresponding charge-limiting circuit to operate when the capacitor is charged to a value corresponding to a reference voltage of the detection circuit. Starting with at least one capacitor substantially discharged, the plurality of capacitors is charged with the charging current. Each detection circuit compares its corresponding reference voltage to the voltage across the corresponding capacitor. When each capacitor is charged to a value corresponding to its reference voltage, the charging current is bypassed therearound. The charging current is terminated when all the capacitors are charged to their corresponding reference voltages.

When the capacitors are partially discharged and subsequently charged with a recharging current, the capacitors are charged to values corresponding to the respective reference voltages at the same time without bypassing the recharging current around one or more of the capacitors.

Other objects and features of the invention will appear in the course of the description thereof which follows.

DETAILED DESCRIPTION OF THE INVENTION

Figure 1:
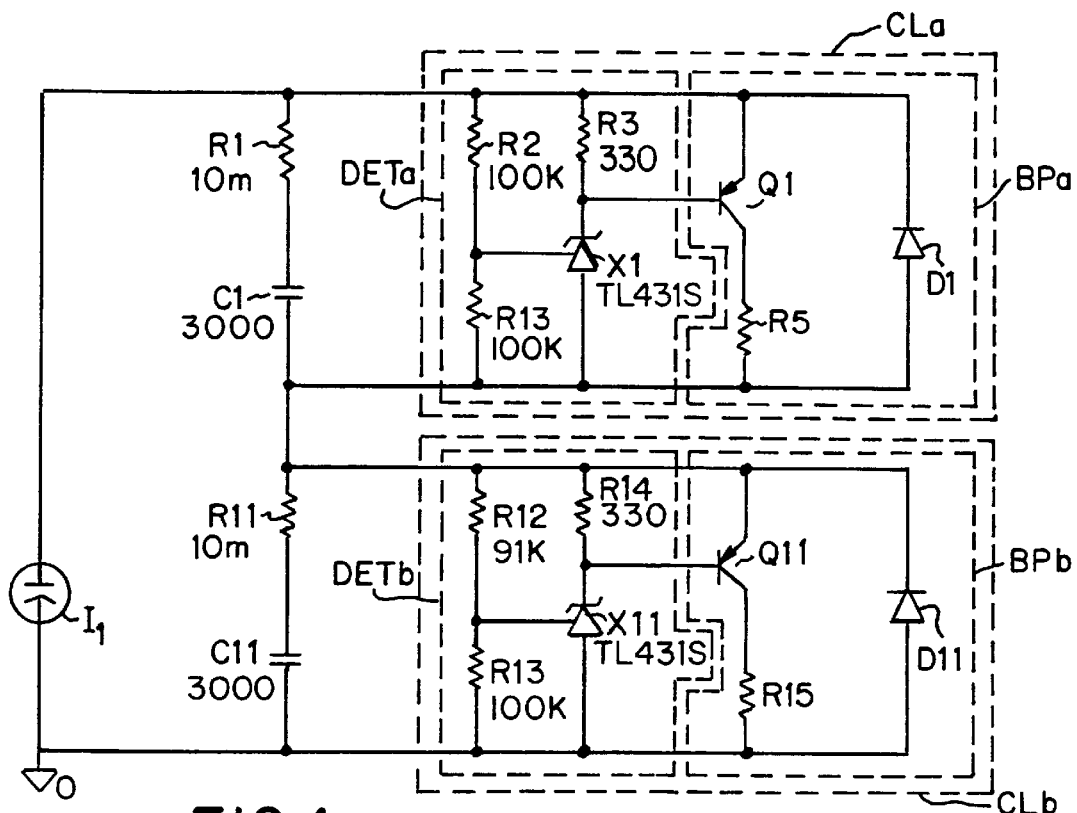
FIG. 1 is a circuit diagram of a charge-limiting circuit consisting of two stages.

An electric double layer capacitor used in the present invention is next described. The electrodes of this capacitor are made of activated carbon which has a large specific surface and is electrochemically inactive. The electrodes are combined with an electrolyte to provide a large electric double layer capacitance. When the voltage applied between the electrodes is increased, the electric double layer is formed and the capacitor is electrically charged until the decomposition voltage of the electrolyte is reached, whereupon a current begins to flow. Therefore, the maximum working voltage of this electric double layer capacitor is restricted by the decomposition voltage of the electrolyte. The decomposition voltage of the electrolyte of a water solution having a high electric conductivity is about 1.23 V. Electric double layer capacitors having maximum working voltages of several volts and capacitances of several farads are commercially available. The internal resistance values vary widely from 100 Ω to about 10 Ω. A recent experimental electric double layer capacitor with non-aqueous electrolyte is reported to have 2.5 V, 240 F, and 0.1 Ω.

Where the prior art electric double layer capacitor is used as a storage capacitor power supply, the maximum working voltage is low and the amount of stored electric charge is small. In addition, the amount of charge stored in the electric double layer capacitor is only one-twentieth of the amount of charge stored in lead-acid batteries on the relation between the energy and the weight. Also, the internal resistance of the electric double layer capacitor is large. Therefore, the electric double layer capacitor cannot be used in high power applications. A fundamental method of permitting the electric double layer capacitor to rival lead-acid batteries is to increase the energy density and reduce the internal resistance.

Generally, if a voltage exceeding the decomposition voltage is applied to a capacitor, decrease in the capacitance, increase in the leakage current and other problems will occur. Therefore, a voltage lower than the decomposition voltage is used as the maximum working voltage. The decomposition voltage is 1.23 V for the case of water and about 1.5 to 2.5 V for the case of normally used organic electrolytes. On the other hand, numerous solvents or chemical materials exist which exhibit decomposition voltages exceeding 5 V in organic electrolytes. However, where they are used in an electric double layer capacitor in practice, the rated maximum working voltage is restricted to 1.5 to 2.5 V. We consider that this is due to impurities, including water.

Various foreign substances are naturally adsorbed to porous electrodes consisting of activated carbon or fibers of activated carbon. If these electrodes are used as they are, the various foreign substances are dissolved in an electrolyte when the electrodes are immersed in the electrolyte. Therefore, if the electrolyte is highly refined, the purity deteriorates, thus lowering the decomposition voltage. Thus, the foreign substances can be removed by previously heating the electrodes in a vacuum vessel by heating while evacuating the inside of the vessel, then cooling the electrodes as they are and immersing them in an electrolyte in a vacuum. Also, decrease in the purity of the electrolyte can be prevented.

In an electrode structure providing a large electrostatic capacitance and a low internal resistance, activated carbon fibers are activated slightly excessively to obtain fibers having somewhat large micropores. These fibers are aligned and arranged closely in a plane. A metal, such as aluminum, is deposited by evaporation or thermal spraying on both ends and the rear surface of the fiber array, or the electrodes are connected by a conductive paint or the like. Then, lead wires are attached. In this manner, electrodes having a low electrical resistance and a high density can be obtained. These electrodes are impregnated with an electrolyte. The electrodes are mounted on opposite sides of an insulating porous separator. They are used as positive and negative electrodes, respectively.

An electric double layer capacitor having a high maximum working voltage can be derived by refining the electrolyte and fabricating and assembling the activated carbon electrodes as described above. Also, the internal resistance can be reduced. As a result, if the maximum working voltage is increased by a factor of 2, for example, then the amount of stored electric charge can be increased fourfold, i.e., the square of 2. The previously mentioned experimental electric double layer capacitor of 2.5 V, 240 F and 0.1 Ω measures 35 mm in diameter by 50 mm. The electric energy when discharged down to 1 V is 0.175 watt-hour (WH). To secure an electric energy of 20 kilowatt-hours required for the power source of an electric vehicle, a volume of about 6 m$^3$ is needed. As an example, however, the volume can be reduced to one-fourth only by doubling the maximum working voltage. Furthermore, the packaging density can be increased by a factor of 2.5. The novel storage capacitor power supply using two capacitor blocks and the charge-limiting circuits improves the amount of stored charge by a factor of about 2. Also, there is a possibility of increase in the electrostatic capacitance. In this way, the amount of stored charge can be increased by a factor exceeding 20. Such electric double layer capacitors are used in different manners to increase the stored electrical energy. Also, the internal resistance is reduced to reduce the energy loss. In consequence, the efficiency at which electric power is supplied can be enhanced.

Electric double layer capacitors have low maximum working voltages of 2.5 to 5 V. Therefore, where they are used in electric power applications, they are connected in series. In this structure, if the voltages assigned to the capacitors are different, the capacitors will successively exceed their rated values from the smallest capacitor and be damaged. To avoid this, they must be used within voltage ranges lower than the rated values. In this case where charge-limiting circuits are connected with all the capacitors, respectively, and they are connected in series, if one capacitor reaches its rated value, the charge-limiting circuit connected with this capacitor turns on the bypass circuit, thus preventing all the capacitors from being applied with voltages exceeding their rated voltages. Consequently, they can be used up to the rated voltages safely. In the novel electric double layer capacitor utilizing an electric double layer capacitor, a charge-limiting circuit is inserted in each cell to monitor the voltages at the cells and make uniform the voltages as described above. Examples of the charge-limiting circuit and an example of a full charge-detecting circuit are described below.

Figure 2:
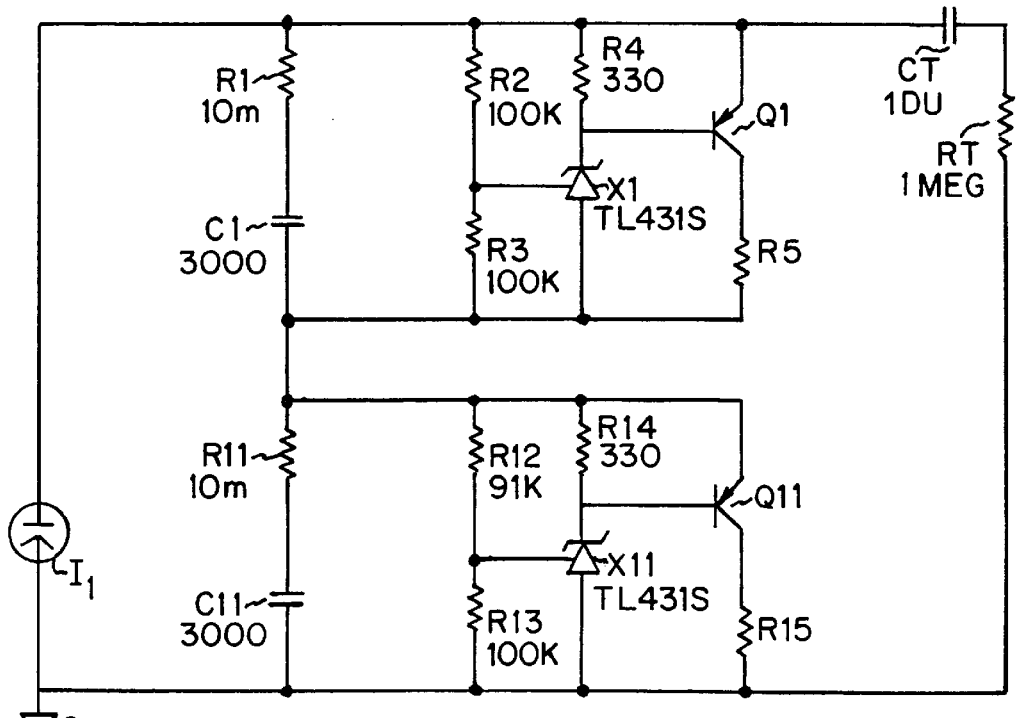
FIG. 2 is a circuit diagram of a full charge-detecting circuit consisting of two stages.
Figure 3:
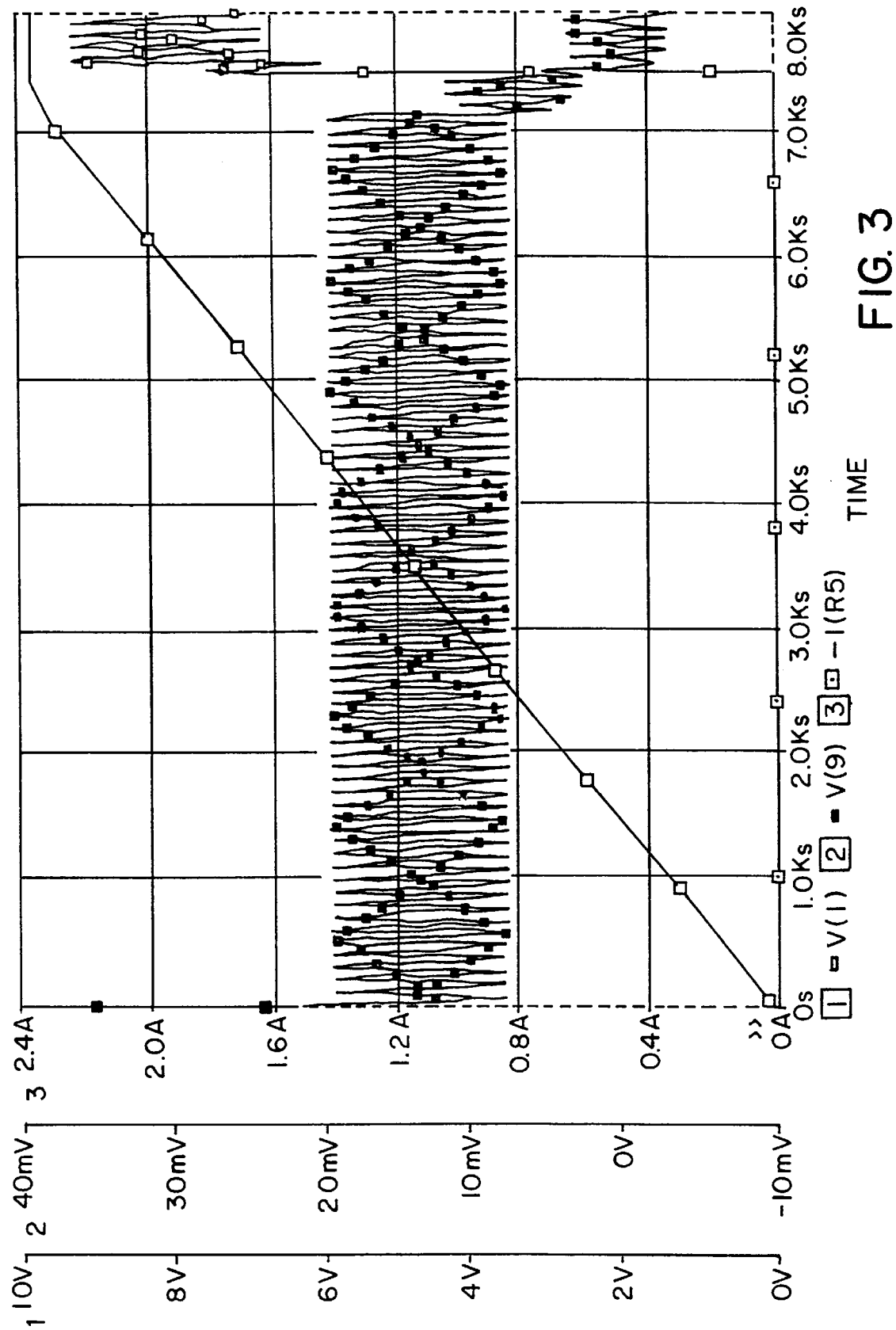
FIG. 3 shows waveforms illustrating the results of an analysis made by simulating the full charge-detecting circuit shown in FIG. 2.

FIG. 1 is a diagram showing a charge-limiting circuit consisting of two stages. FIG. 2 is a diagram showing a full charge-detecting circuit consisting of two stages. FIG. 3 shows the results of an analysis made by simulating the full charge-detecting circuit shown in FIG. 2.

The configuration shown in FIG. 1 is built for electrical power applications as described below. The electric double layer capacitors C1 and C11 are connected in series. The charge-limiting circuit CLa including the components R2–R5, X1, Q1 and D11 and the charge-limiting circuit CLb including the components R12–R15, X11, Q11 and D11 are connected with the capacitors C1 and C11, respectively. When each capacitor reaches its rated voltage, the charge-limiting circuit connected with the capacitor turns on the bypass circuit. Thus, all the capacitors are prevented from being applied with a voltage exceeding the rated value. In this manner, the voltages of the cells are monitored and can be made uniform. Consequently, the power supply can be used up to the rated value safely. Furthermore, the fully charged condition can be detected precisely by detecting the condition in which all the charge-limiting circuits connected in series via the differentiating circuit consisting of CT and RT as shown in FIG. 2 have been operated.

In the configuration shown in FIG. 2, the two electric double layer capacitors C1 and C11 are connected in series. A simulation was made in which each of these two capacitors C1 and C11 had a maximum working voltage of 25 V and an electrostatic capacitance of 600 F, and in which the setting of the charge-limiting circuits were intentionally shifted to about 24 V and 23 V, respectively. The results of this analysis are shown in FIG. 3. That is, the line indicating the whole charging voltage V(1) is bent near the end of the charging process. Observation of the terminal voltage V(9) at the resistor RT of the differentiating circuit and the current I(R5) flowing through the resistor R5 of one charge-limiting circuit shows that one capacitor is fully charged and then the other is fully charged.

Figure 4:
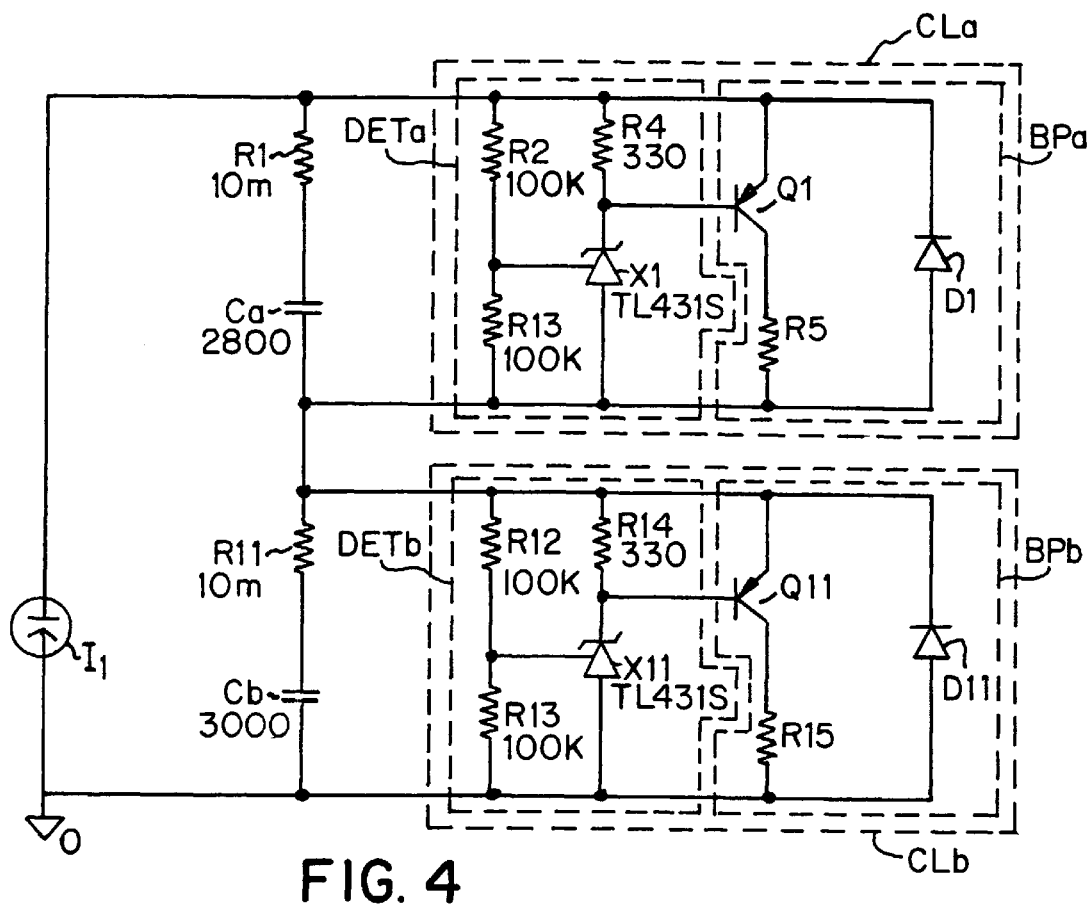
FIG. 4 is the circuit diagram of FIG. 1 having different values of capacitors.
Figure 5:
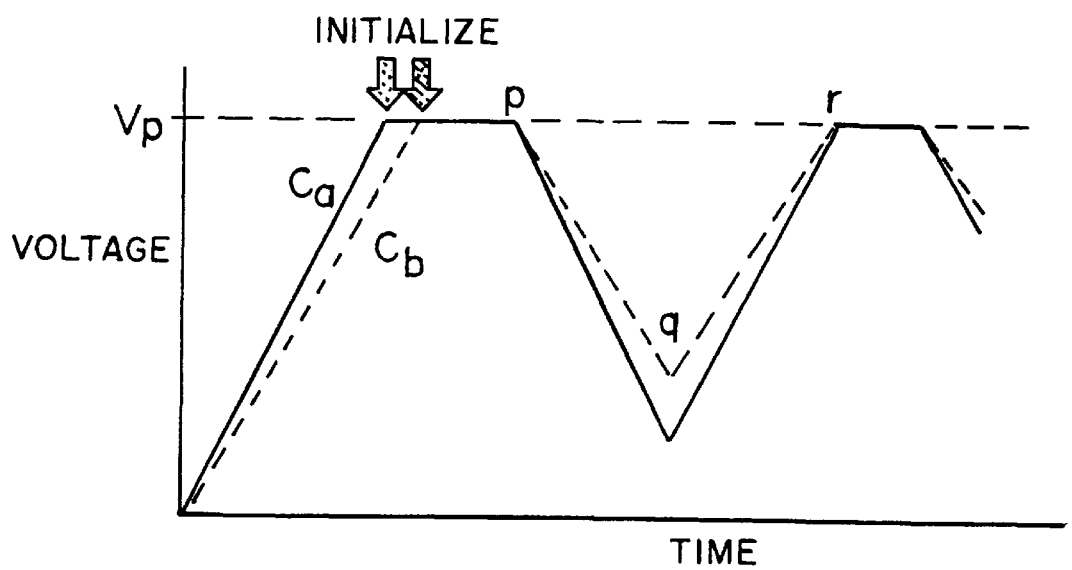
FIG. 5 is a waveform of voltage versus time for the charging, discharging and recharging of capacitors of FIG. 3.

With reference to FIGS. 4 and 5, the electric double layer capacitors $C_a$ and $C_b$ are connected in series. The charge-limiting circuit CLa, including the components R2–R5, X1, Q1 and D11 and the charge-limiting circuit CLb including the components R12–R15, X11, Q11, and D11 are connected with the capacitors $C_a$ and $C_b$, respectively. When the capacitors $C_a$ and $C_b$ reach their rated voltages, the detector circuits DETa and DETb turn on the bypass circuits BPa and BPb, respectively. More specifically, the detection circuits DETa and DETb of the charge-limiting circuits CLa and CLb establish a reference voltage $V_p$ for the regulators X1 and X11, respectively. As shown in FIG. 4, capacitor $C_a$ has a smaller capacitance than the capacitor $C_b$. This difference in capacitance can be caused by variations among like rated capacitors due to manufacturing and/or material tolerances or the capacitor power supply can be designed to have different value capacitors.

As shown in FIG. 5, the capacitors $C_a$ and $C_b$ are initialized for charging and discharging based on the reference voltage $V_p$. More specifically, starting with each capacitor $C_a$ and $C_b$ substantially discharged, the capacitors $C_a$ and $C_b$ are charged with the charging current. The detection circuits DETa and DETb of the charge-limiting circuits CLa and CLb compare the voltage $V_p$ to the voltages across the capacitors $C_a$ and $C_b$, respectively. Charging the capacitors $C_a$ and $C_b$ to the corresponding reference voltage $V_p$ initializes the capacitors $C_a$ and $C_b$ for subsequent discharging and charging. When the capacitors $C_a$ and $C_b$ are initialized, the charging current is terminated.

As shown in FIG. 5, the smaller capacitance of capacitor $C_a$ enables it to be charged to a value corresponding to its reference voltage $V_p$ before the capacitor $C_b$ is charged to its reference voltage. At a time p, the capacitors $C_a$ and $C_b$ are discharged into a load (not shown) with a common discharge current flowing through the capacitors $C_a$ and $C_b$. Since the capacitance of capacitor $C_a$ is less than the capacitance of capacitor $C_b$, the voltage across capacitor $C_a$ decreases faster than the voltage across capacitor $C_b$. At time q, discharging is terminated and charging of capacitors $C_a$ and $C_b$ with a recharging current is initiated. The difference in voltage across capacitors $C_a$ and $C_b$ at time q enables the recharging current to charge the capacitors $C_a$ and $C_b$ such that they charge to values corresponding to their reference voltages at the same time r without bypassing the recharging current around at least one of the capacitors $C_a$ and $C_b$.

Based on the foregoing, it can be seen that during initialization, capacitors $C_a$ and $C_b$ can be charged to values corresponding to their respective reference voltages over different intervals of time. However, once initialized, the capacitors $C_a$ and $C_b$ can be recharged to values corresponding to their respective reference voltages from a partially discharged state, over the same interval of time.

It is to be understood that the present invention is not limited to the above-described embodiments and that various changes and modifications are possible. In the above embodiments, the means which turns on and off the circuit is merely a switch. A semiconductor switching device, such as a FET or a transistor, or other switching device may be used. Furthermore, the application of the novel electric double layer capacitor is not limited to the power supply of an electric vehicle. For instance, the novel power supply can also be used as the power supply of an electric welder or other electrically powered machine, as the power supply of a portable electrical appliance, such as a flash lamp, radio receiver, television receiver or video camera.

According to the present invention, as can be seen from the description made thus far, the charging of each capacitor is controlled to the full charge level by the voltage across the terminals of the capacitor. Therefore, the electrical energy can be stored effectively. Also, the efficiency at which the storage capacitor power supply supplies electric power can be enhanced. Furthermore, the capacitors can be prevented from being applied with voltages exceeding their rated voltages. Consequently, where the power supply is used to store electricity, decreases in the capacitances of the capacitors, increase in the leakage current and other problems can be prevented.

Having thus described my invention with the detail and particularity required by the Patent Laws, what is desired protected by Letters Patent is set forth in the following claims.

What is claimed is:

1. A storage capacitor power supply which stores electricity in a capacitor block having a plurality of capacitors connected in series to supply electric power to a load, the power supply comprising:

a charging power supply connected to electrically charge the capacitor block with a charging current; and a charge-limiting circuit which includes a bypass circuit connected in parallel with each capacitor of the capacitor block and a detection circuit, with each detection circuit connected to detect the voltage developed across the capacitor connected in parallel therewith, wherein:

for each capacitor of the capacitor block, the charge-limiting circuit initializes the voltage thereof for discharging and charging based on a reference voltage by causing the bypass circuit to bypass the charging current around the capacitor when a voltage detected by the detection circuit reaches the reference voltage;

once initialized, all the capacitors are discharged with a common discharging current and recharged with a common recharging current; and in response to receiving the recharging current, each capacitor reaches the reference voltage absent the need to bypass the charging current around any capacitor.

2. The power supply as set forth in claim 1, wherein each capacitor reference voltage is the same.

3. A method of operating a capacitor power supply comprising a plurality of capacitors connected in series to supply electric power on discharge, the method comprising the steps of:

a) first, charging all capacitors to the same voltage bypassing the charging current around any capacitor that has already been charged to the voltage; and b) thereafter, discharging and charging the capacitors such that on recharging all capacitors reach the voltage at the same time without the need for bypassing current around capacitors.

4. A method of charging and discharging a capacitor power supply having a plurality of capacitors connected in series to supply electric power to a load on discharge, the method comprising the steps of:

a) starting with at least one capacitor substantially discharged, charging the plurality of capacitors connected in series with a charging current;

b) comparing a voltage across each capacitor to a corresponding reference voltage;

c) when each capacitor is charged to a value corresponding to its reference voltage, bypassing the charging current therearound;

d) terminating the charging current when all the capacitors are charged to their corresponding reference voltages;

e) discharging the plurality of capacitors connected in series with a discharge current; and f) charging the plurality of capacitors connected in series with a recharging current such that all the capacitors are charged to values corresponding to their respective reference voltages at the same time without bypassing the recharging current around at least one of the capacitors.

5. The method as set forth in claim 4, wherein each capacitor reference voltage is the same.

* * * * *